(12) United States Patent
Cypers et al.

(10) Patent No.: US 9,849,787 B2
(45) Date of Patent: Dec. 26, 2017

(54) ELECTRIC TRACTION SYSTEM FOR A RAILWAY VEHICLE AND PROTECTION METHOD REALIZED BY SUCH A SYSTEM

(71) Applicant: ALSTOM TRANSPORT TECHNOLOGIES, Saint-Ouen (FR)

(72) Inventors: David Cypers, Odos (FR); Guillaume Desportes, Maubourguet (FR)

(73) Assignee: ALSTOM TRANSPORT TECHNOLOGIES, Saint-Ouen (FR)

( * ) Notice: Subject to any disclaimer, the term of this patent is extended or adjusted under 35 U.S.C. 154(b) by 78 days.

(21) Appl. No.: 14/971,473

(22) Filed: Dec. 16, 2015

(65) Prior Publication Data
US 2016/0167523 A1 Jun. 16, 2016

(30) Foreign Application Priority Data
Dec. 16, 2014 (FR) ..................... 14 62508

(51) Int. Cl.
 *B60L 3/00* (2006.01)
 *B60L 3/04* (2006.01)
 *H02H 7/08* (2006.01)
 *H02H 7/06* (2006.01)
 (Continued)

(52) U.S. Cl.
 CPC .......... *B60L 3/0069* (2013.01); *B60L 3/0038* (2013.01); *B60L 3/0061* (2013.01); *B60L 3/0084* (2013.01);
 (Continued)

(58) Field of Classification Search
 CPC .... B60L 3/0069; B60L 3/0061; B60L 3/0038; B60L 3/0084; B60L 3/04; H02H 7/0805; H02H 7/065; H02H 3/083
 See application file for complete search history.

(56) References Cited

U.S. PATENT DOCUMENTS

| 7,049,787 B2 * | 5/2006 | Knapp | H02M 7/003 318/729 |
| 2008/0012512 A1 * | 1/2008 | Kawakami | B60L 3/0061 318/143 |

(Continued)

FOREIGN PATENT DOCUMENTS

| EP | 1544974 A1 | 6/2005 |
| EP | 2515419 A1 | 10/2012 |

(Continued)

OTHER PUBLICATIONS

Search Reports dated Jul. 24, 2015 in corresponding FR application No. 1462508.

*Primary Examiner* — Dale W Hilgendorf
(74) *Attorney, Agent, or Firm* — Knobbe Martens Olson & Bear LLP

(57) ABSTRACT

A system includes a converter for powering a synchronous electric machine to which it is connected by cables, an insulating device and a mechanism for short-circuiting phases of the machine. The system includes primary detectors for detecting an overcurrent in the converter and a securing device able to open the insulating device when receiving a primary detection signal emitted by the primary detector. The system also includes secondary detectors able to detect a short-circuit downstream from the insulating device and to emit a secondary detection signal toward the securing device, the latter actuating the closing of the mechanism for short-circuiting as long as they have already received a primary detection signal having led to the opening of the insulating device.

6 Claims, 4 Drawing Sheets

(51) Int. Cl.
  *H02H 3/08* (2006.01)
  *B60L 3/06* (2006.01)
  *B60L 15/00* (2006.01)
  *B60L 15/38* (2006.01)
  *B61C 3/00* (2006.01)
  *B60L 11/18* (2006.01)

(52) U.S. Cl.
  CPC .............. *B60L 3/04* (2013.01); *H02H 3/083* (2013.01); *H02H 7/065* (2013.01); *H02H 7/0805* (2013.01); *B60L 3/06* (2013.01); *B60L 11/1803* (2013.01); *B60L 15/007* (2013.01); *B60L 15/38* (2013.01); *B60L 2200/26* (2013.01); *B60L 2210/40* (2013.01); *B60L 2220/14* (2013.01); *B60L 2240/526* (2013.01); *B60L 2240/527* (2013.01); *B61C 3/00* (2013.01); *Y02T 10/7241* (2013.01)

(56) References Cited

U.S. PATENT DOCUMENTS

| | | | |
|---|---|---|---|
| 2010/0076638 A1* | 3/2010 | Kitanaka | B60L 3/0061 701/22 |
| 2011/0043152 A1* | 2/2011 | Kidokoro | B62D 5/04 318/490 |
| 2013/0221888 A1* | 8/2013 | Horikoshi | H02P 27/06 318/400.29 |
| 2013/0229732 A1* | 9/2013 | Cypers | B60L 3/0061 361/31 |

FOREIGN PATENT DOCUMENTS

| | | |
|---|---|---|
| EP | 2634884 A1 | 9/2013 |
| FR | 2987628 A1 | 2/2013 |
| WO | 2008/122602 A1 | 10/2008 |

* cited by examiner

ELECTRIC TRACTION SYSTEM FOR A RAILWAY VEHICLE AND PROTECTION METHOD REALIZED BY SUCH A SYSTEM

CROSS-REFERENCE TO RELATED APPLICATIONS

This application claims priority to French Patent Application No. FR 14 62508 filed on Dec. 16, 2014, the disclosure of which including the specification, the drawings, and the claims is hereby incorporated by reference in its entirety.

TECHNICAL FIELD OF THE INVENTION

The present invention relates to an electric traction system for a railway vehicle, comprising a synchronous electric machine and a power supply circuit, the power supply circuit including a converter, connected to a DC voltage source and able to deliver a polyphase voltage adapted to the power supply of the machine, to which the converter is connected, by a plurality of electric cables, an insulating device and means for short-circuiting the phases of the machines, placed downstream from the insulating device, the system further including means for controlling the converter, primary detection means for detecting an over-current in output branches of the converter, and safety means able to actuate the opening of the insulating device upon reception of a primary detection signal emitted by the primary detection means.

BACKGROUND OF THE INVENTION

Document EP 2,634,884 discloses such a system including, as primary detection means, current sensors for detecting an output over-current of the converter.

In document EP 2,634,884, the implemented monitoring method provides for monitoring measurements delivered by the current sensors in order to detect the occurrence of a short-circuit-type fault, then, in that case, actuating insulating circuit breakers in order to insulate the converter from the electric machine, which, set in rotation by the wheels of the moving railway vehicle, then operates as a current generator.

The securing method next provides for identifying whether the short-circuit is of the internal or external type with respect to the electric machine. If the short-circuit is internal, the method provides for actuating means for short-circuiting the phases of the electric machine (so-called symmetrization operation), by closing the short-circuiting means.

However, this document of the state of the art does not describe how to detect whether a fault having caused the actuation of the insulating circuit breaker is a fault internal to the electric machine.

If the short-circuit at the origin of the over-currents in the branches of the converter is situated downstream from the insulating circuit breaker, i.e., if it is either a short circuit external to the electric machine, for example between the electric cables connecting each branch of the converter to each phase of the electric machine, or a short-circuit internal to the electric machine, opening the circuit breaker does not suffice to insulate the short-circuit from the power supply source, in the case at hand the traction motor, as long as the latter is rotating.

It should be noted that a downstream short-circuit between a phase of the electric machine and the ground can be insulated by opening the insulating circuit breaker. However, such an electric fault can turn into an inter-phase short-circuit, which cannot be insulated by opening the insulating circuit breaker. Here, such a fault is considered a non-insulatable downstream short-circuit.

A short-circuit can be "dead", when the two conductors are in direct contact with one another, or "non-dead", when the two conductors do not touch one another directly, but are connected by means of a medium having a certain impedance. In the latter case, the short-circuit results in the formation of a permanent or intermittent electric arc. This type of fault develops an energy leading to the combustion of the components and surrounding materials of the electric arc: vaporization of the material, modification of the properties of the material, etc.

Note that a dead fault can turn into a non-dead fault by overheating and deterioration of the materials of the conductors initially in contact.

A non-dead short-circuit internal to the electric machine can lead to the destruction of the electric machine with risks of fire (appearance of flames: the electric arc is present until consumption of the phase circle) and/or blockage of the rotor (the material of the phase circle is housed in the air gap, thus damaging the freight and releasing the magnets mounted on the surface).

SUMMARY OF THE INVENTION

The invention therefore aims to resolve this problem, in particular by making it possible to discriminate between a downstream fault internal to the electric machine and a downstream fault external to the electric machine, so as to select the appropriate action: simple opening of the insulating circuit breaker or need also to perform a symmetrization between the phases.

The invention therefore relates to a traction system of the aforementioned type, characterized in that it further includes secondary detection means able to detect the presence of a fault of the short-circuit type downstream from the insulating device and to emit a secondary detection signal toward the securing means, and in that the securing means are able to actuate closing of the short-circuiting means for the phases of the machine upon reception of the secondary detection signal, on the condition they have already received a primary detection signal emitted by the primary detection means and having led to actuating the opening of the insulating device.

According to specific embodiments, the system includes one or more of the following features, considered alone or according to any technically possible combinations:

the secondary detection means include at least one temperature sensor, able to measure a temperature corresponding to an internal temperature of the synchronous electric machine.

the secondary detection means include a secondary detection device able to calculate a time variation of the temperature measured by the or each temperature sensor.

the secondary detection device compares the time variation of the temperature to a predetermined threshold, and emits a signal for detecting a short-circuit when the time variation of the temperature is above said predetermined threshold.

the predetermined threshold is greater than +1.0° C./s, in particular equal to +1.7° C./s.

the secondary detection means are also able to discriminate whether the fault detected by the primary detection means is a non-dead short-circuit external to the synchronous electric machine of the initiating type between the electric cables, by comparing the time variation of the temperature to a second predetermined threshold, equal to approximately +0.5° C./min.

the secondary detection means include at least two voltage sensors able to measure a voltage imbalance between the phases of the synchronous electric machine, the voltage sensors being placed as close as possible to the power supply terminals of the synchronous electric machine.

the secondary detection means include a detection device able to calculate a voltage deviation from measurements delivered by the voltage sensors and generate a detection signal for a non-dead short-circuit internal to the synchronous electric machine when the calculated deviation is above a predetermined threshold.

a voltage sensor is connected between the power supply terminals of two different phases; or is connected between a power supply terminal of a phase and a shared connection point of the different voltage sensors to one another, this shared point being able to be connected to an electric ground of the system.

The detection of a non-dead short-circuit internal to the machine can be done by measuring voltages between the phases of the machine or by measuring the internal temperature of the machine.

Once a non-dead internal short circuit is detected, a symmetrization of the machine is undertaken, which consists of short-circuiting the different phases thereof relative to one another so as to extinguish the short-circuit arc that develops inside the machine, rebalance the inter-phase short-circuit and thus avoid torque pulses that result from this imbalance.

The invention also relates to a securing method implemented in the aforementioned traction system, characterized in that it includes the steps successively consisting of: detecting an overvoltage in at least one output branch of the converter; actuating the opening of the insulating device; then detecting a fault of the short-circuit type downstream from the insulating device; and, in the affirmative; and actuating the closing of the short-circuiting means of the phases of the synchronous electric machine.

BRIEF DESCRIPTION OF THE DRAWINGS

The invention and its advantages will be better understood upon reading the following detailed description of one particular embodiment, provided solely as a non-limiting example, this description being done in reference to the appended drawings, in which.

DETAILED DESCRIPTION OF SOME EMBODIMENTS

Figure 1:
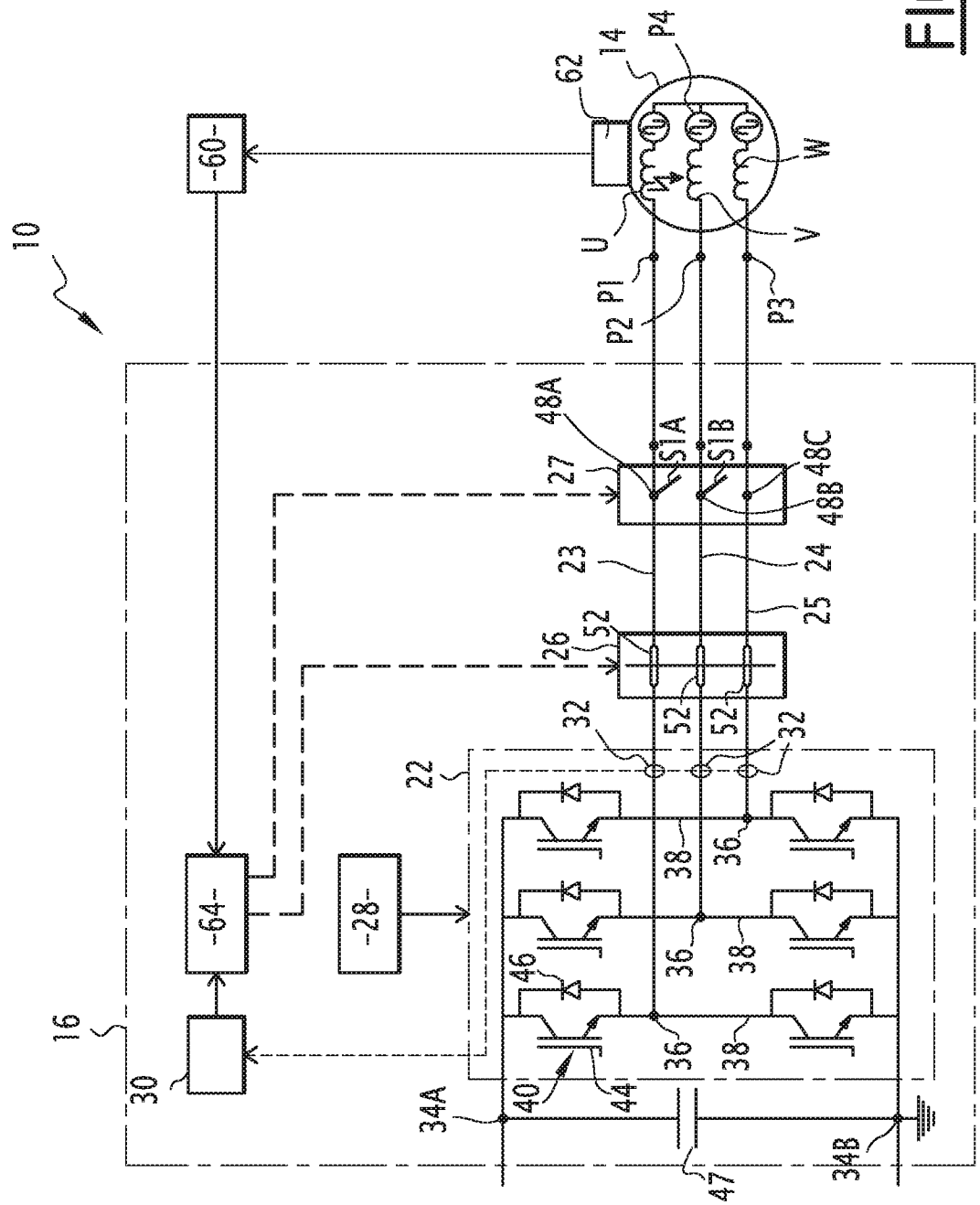
FIG. 1 is a diagrammatic illustration of a system according to a first embodiment of the invention.

FIG. 1 diagrammatically shows a first embodiment of an electric traction system according to the invention, installed on board a railway vehicle, such as a metro, tram, regional train or high-speed train.

The system 10 is connected, between its terminals 34A and 34B, to a DC voltage source (not shown). The DC voltage source is for example a catenary, connected to an electric grid. The DC voltage source delivers a voltage above 600 V, for example equal to 3 kV.

The system 10 comprises at least one synchronous electric machine 14. The machine 14 includes a rotor and a stator. The rotor comprises permanent magnets. The stator comprises N windings, or phases, designed to be powered by a suitable polyphase voltage.

The machine 14 is, as shown in the figures, a three-phase synchronous electric motor with permanent magnets. The machine 14 for example has a nominal power comprised between 50 kW and 2 MW. Each phase U, V, W of the machine 14 is connected between a power terminal P1, P2, P3, respectively, and a terminal P4, shared by the different phases.

The system 10 includes a power supply circuit 16 of the machine 14.

The power supply circuit 16 comprises a converter 22 for converting a DC voltage, delivered at the input by the DC voltage source, into a three-phase output AC voltage, adapted to the power supply of the machine 14.

The converter 22 includes a positive input terminal 34A and a negative input terminal 34B, which are connected to the DC voltage source.

A converter 22 includes three output terminals 36. Each output terminal 36 is associated with a phase of the polyphase AC current and is connected to one of the phases U, V, W of the machine 14, by means of electric cables 23, 24, 25.

The converter 22 comprises a switching branch 38 for each output terminal 36.

Each switching branch 38 is connected between the positive input terminal 34A and the negative input terminal 34B and comprises two electric switches 40, which are connected in series and in the same direction, and connected to one another by a midpoint. Each midpoint is one of the output terminals 36 of the converter 22.

Each electric switch 40 is a two-way switch in current and a one-way switch in voltage. Each electric switch 40 comprises a transistor 44 and a diode 46 connected in antiparallel, thus ensuring bidirectional current flow paths when the transistor 44 is on.

A transistor 44 is for example an insulated gate bipolar transistor (e.g., IGBT). The gate of each transistor 44 is connected to control means 28 for receiving an appropriate control signal.

The power supply circuit 16 also comprises a storage bank positioned between the DC voltage source and the input of the converter 22. The storage bank for example comprises a storage capacitor 47 connected between the two input terminals 34A, 34B of the converter 22.

The power supply circuit 16 includes an insulating device, e.g. an insulator 26, positioned immediately at the output of the converter 22.

The insulating device 26 is able to insulate the downstream part of the system 10, including the cables 23, 24 and 25 and the machine 14, from the upstream part of the system 10 made up of the converter 22 and the storage bank 47.

In the example embodiment, the insulating device 26 is a vacuum bulb insulating device, made according to the teaching of the patent application filed under number FR 2,906,194 on Sep. 21, 2006 by the company Alstom Transport S.A.

The insulating device 26 comprises three switching branches. Each switching branch includes an electric switch 52 for sectioning the corresponding phase of the machine 14. Each switch 52 has two states: an open state and a closed state. It is controlled by the securing means 64. The different switches 52 are controlled synchronously by a same control signal.

Alternatively, each switching branch includes a number P of sectioning electric switches 52 connected in series, P being an integer greater than or equal to two.

The power supply circuit 16 further comprises means 27 for short-circuiting phases of the machine 14, positioned between the insulating device 26 and the terminals P1, P2, P3 of the machine 14. The means 27 are able to connect the three phases of the machine 14 to one another. Advantageously, the means 27 are placed as close as possible to the machine 14, i.e., connected directly to the power supply terminals of the phases thereof.

The means 27 are controlled by the securing means 64.

In the present embodiment, the means 27 are made up of a contactor with two states with a cut-set traditional in the art. Alternatively, the means 27 are made up of a contactor with two states with a cut-set by vacuum bulb, as described in light of FIG. 2 of document FR 2,906,194.

Such a contactor includes three switching terminals 48: a first switching terminal 48A, a second switching terminal 48B, and a third switching terminal 48C. Each power supply terminal P1, P2, P3 of the machine 14 is connected to one of the switching terminals 48A, 48B, 48C of the contactor 27.

A switch S1A is positioned between the terminals 48A, 48B, and a switch S1B is positioned between the terminals 48B, 48C.

Each switch S1A, S1B has two states: an open state and a closed state. The two switches are in the same state at all times, open or closed.

In its closed state, the switch S1A connects the first switching terminal 48A to the second switching terminal 48B so as to short-circuit the phases U and V of the machine 14. In its open state, the switch S1A insulates the other of the phases U and V of the machine 14. In the closed state, the switch S1B connects the second switching terminal 48B to the third switching terminal 48C, so as to short-circuit the phases U and W of the machine 14. In its open state, the switch S1B insulates one of the phases V and W of the machine 14 from the other.

Each switch S1A, S1B is connected to the securing means 64 to receive a same control signal.

Alternatively, the contactor is replaced by any switching device having two positions: a first position able to insulate the phases of the machine 14 from one another, and a second position able to connect the phases of the machine 14 directly to one another (in the present embodiment, on the side of the input terminals thereof, since the phases are also connected to one another at a shared neutral point P4).

The power supply circuit 16 further comprises control means 28. They are able to send control signals to the converter 22. The control means 28 include a computer implementing a control law of the switches 40 of the converter 22.

The system 10 includes a monitor including a primary detector (primary detecting means), a secondary detector (secondary detecting means) and securing means.

The primary detection means include a plurality of current sensors 32. Each sensor 32 is able to measure the current flowing through each output terminal 36 of the converter 22.

The instantaneous values measured by each sensor 32 are sent to a primary detection device 30 capable of emitting a primary detection signal when an excess current is detected.

This primary detection signal is applied at the input of the securing means 64.

Upon reception of the primary detection signal, the means 64 generate a command signal to open the insulating device 26.

In the first embodiment, the secondary detection means include a temperature sensor 62. The sensor 62 is able to measure an instantaneous temperature of the machine 14. The temperature sensor is for example housed inside the housing of the machine 14 to measure the temperature of the air gap between the rotor and the stator thereof. Preferably, the sensor is positioned on one of the flanges of the machine 14, across from the coil heads of the windings of the stator of the machine 14, since that is where the increase in the temperature of the air is greatest. Also preferably, for better sensitivity, the sensor 62 is installed on the flange on the control side, as opposed to the fan side of the machine 14.

The instantaneous values measured by the sensor 62 are sent to a secondary detection device 60 able to calculate the temperature gradient, i.e., the variation over time of the temperature measured by the sensor 62.

If this gradient is above a predetermined threshold, a secondary detection signal is generated by the secondary detection device 60. Indeed, it has been observed that, in the minutes following the appearance of a non-dead internal short circuit, the temperature gradient of the air in the machine 14 goes through several degrees per second, whereas it is only several tenths of degrees in a nominal state. For example, a threshold at 1.7° C./s makes it possible to discriminate the occurrence of a non-dead internal short circuit.

The generated secondary detection signal is applied at the input of the securing means 64.

Upon reception of the secondary detection signal 60, the means 64 generate a control signal to close the switches of the means 27.

The operation of the system 10 will now be explained.

In the initial configuration, the switches 52 of the insulating circuit breaker are closed, and the switches S1A, S1B of the means 27 are open. The converter 22 and the machine 14 are electrically connected via the insulating device 26 and the contactor 27. An AC current is delivered by the converter 22 to the stator of the machine 14.

When an electrical fault occurs, internal or external to the machine 14, the primary detection means detect an overcurrent in the currents flowing in the switching branches 38, at the output of the converter 22.

The securing means 64 actuate the opening of the switches 52. The switches 52 open, but the switches S1A, S1B remaining open. The machine 14 is then insulated from the power supply chain 16.

If the short-circuit is internal to the machine 14, the temperature measured by the sensor 62 increases, such that its gradient exceeds the predefined threshold.

The detection of this fault leads the secondary detection device 60 to emit a secondary detection signal toward the securing means 64.

The securing means 64 then actuate the closing of the switches S1A, S1B of the means 27. The witches S1A, S1B close, while keeping the switches 52 open.

The three phases U, V, W of the machine 14 are then short-circuited. The electric arc that has formed quickly loses intensity and disappears.

The switches S1A and S1B are kept closed until the railway vehicle is stopped and/or until intervention by an operator responsible for preparing the electric traction system 10.

Thus, the symmetrization action is carried out only when the non-dead short-circuit is of the internal short circuit type, i.e., if the current measured in each branch of the converter is above a predetermined value and if the temperature gradient is above a predetermined threshold.

In order to avoid generating false detections, the temperature sensor 62 is tested continuously. The detection of a temperature gradient above the predetermined threshold is considered to be a false detection, inasmuch as it is not previously accompanied by the detection of an overcurrent.

Alternatively, the secondary detection means is also capable of discriminating an external non-dead short-circuit of the initiating type with an electric arc between the electric cables 23, 24 and/or 25. Indeed, it has been observed that it is possible to detect such a fault, which is characterized by an increase of approximately 5° C. of the temperature measured by the sensor 62 over a period between 5 and 15 min., in particular 10 min.

This type of secondary detection is relatively slow. Indeed, the fault is only detected when the electric arc is already at the core of the electric machine and in all likelihood has begun to cause irreversible damage.

A second embodiment will now be described in reference to FIG. 2, which allows the machine 14 to be secured much more quickly than in the first embodiment.

Figure 2:
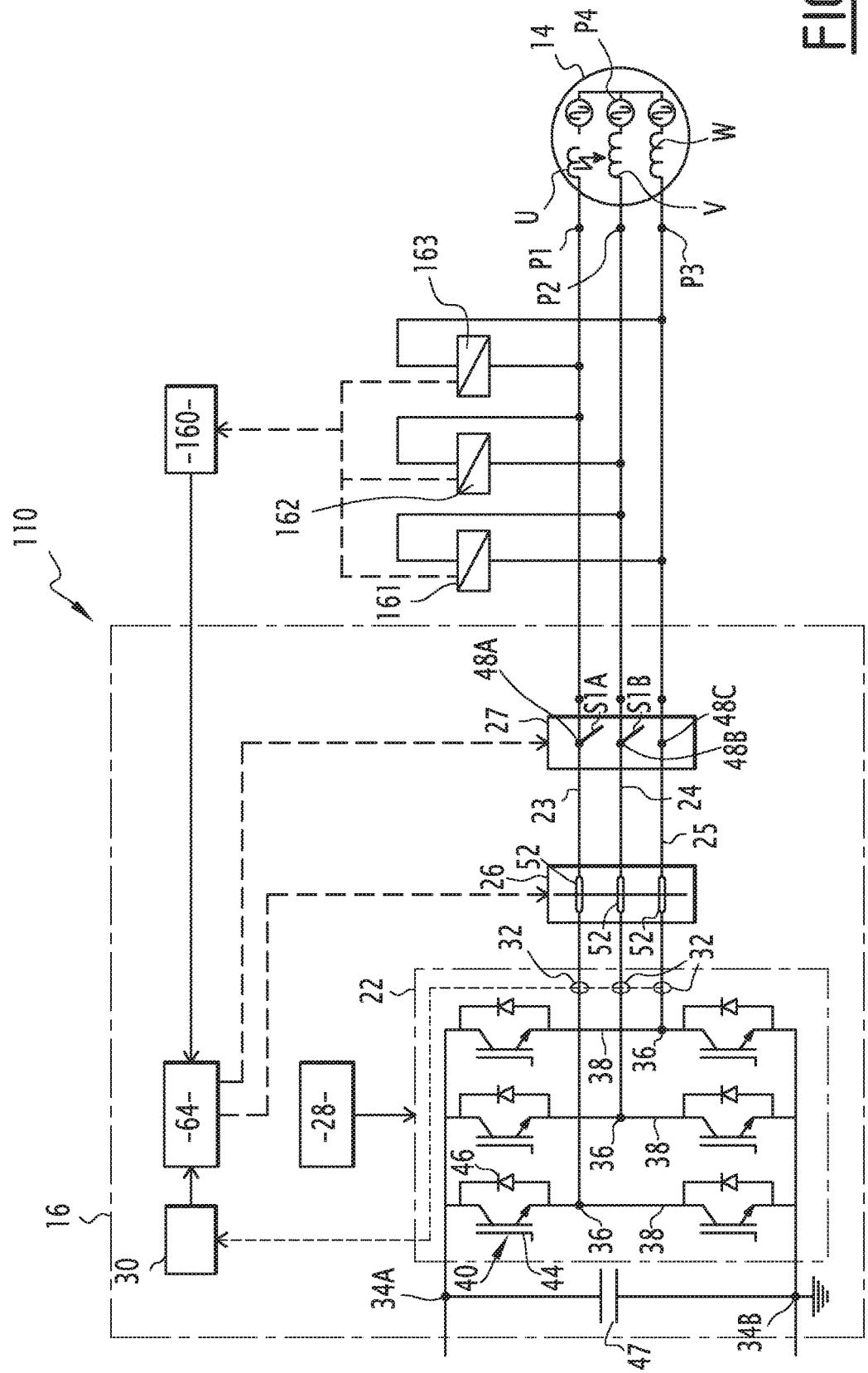
FIG. 2 is a diagrammatic illustration of a system according to a second embodiment of the invention.

Elements of FIG. 2 that are identical to those of FIG. 1 are referenced using the same reference numbers as in FIG. 1.

The system 110 of FIG. 2 is completely identical to the system 10 of FIG. 1, with the exception of the secondary detection means.

In the second embodiment, the secondary detection means are made up of voltage sensors.

In order to detect with certainty that the short-circuit is a short circuit downstream from the insulating contactor, the voltage sensors are situated as close as possible to the power supply terminals of the machine 14.

In the alternative embodiment of FIG. 2, a first sensor 161 is connected between the terminals P1 and P2 of the machine 14, a second sensor 162 is connected between the terminals P2 and P3 of the machine 14, and a third sensor 163 is connected between the terminals P3 and P1 of the machine 14.

The secondary detection device 160 performs the real-time acquisition of the value of the voltages measured by each of the voltage sensors 161, 162 and 163 and determines deviations corresponding to voltage imbalances between pairs of phases U, V and W of the machine 14.

When two of these deviations are above a predetermined threshold, the secondary detection device 160 considers that a short-circuit-type fault is detected and sends a secondary detection signal to the securing means 64.

It should be noted that two voltage sensors and the calculation of two deviations are sufficient to detect a fault of the short-circuit type, inasmuch as one of the deviations is above the predetermined threshold. However, the presence of a third sensor makes it possible to calculate a third deviation and thus to obtain a safer detection, in particular in case of failure of one of the sensors.

If the insulating circuit breaker has been actuated to open, an imbalance between the voltages between the phases of the machine indicates a non-dead short-circuit.

Under these conditions, the securing means 64 actuate the closing of the switches S1A, S1B of the means 27.

In this example, the measurement of the voltages makes it possible to detect the non-dead short-circuit quickly after the insulating circuit breaker has been opened (several seconds). The phases of the electric machine are then short-circuited by actuating the switches of the means 27, so as to avoid or at least greatly reduce the damage caused on the machine 14.

In order to be completely effective, the detection must be done from an imbalance between two voltages, but also from deviations between the amplitude of the effective value of each voltage and a theoretical effective value, which corresponds to the amplitude of a vacuum counter-voltage of the electric machine for example operating at 1000 revolutions per minute. This theoretical value is valid over the entire speed range. The measured effective value is therefore compared to the theoretical effective value.

To avoid a false detection, the voltage sensors are tested continuously when the machine is powered by the converter 22 (nominal operating state of the system). If an imbalance and/or an amplitude deviation is measured whereas no overcurrent has been detected by the primary detection means, it is considered that one of the voltage sensors 161, 162, 163 is faulty. Using three sensors allows redundancy ensuring the identification of the faulty voltage sensor.

Figure 3:
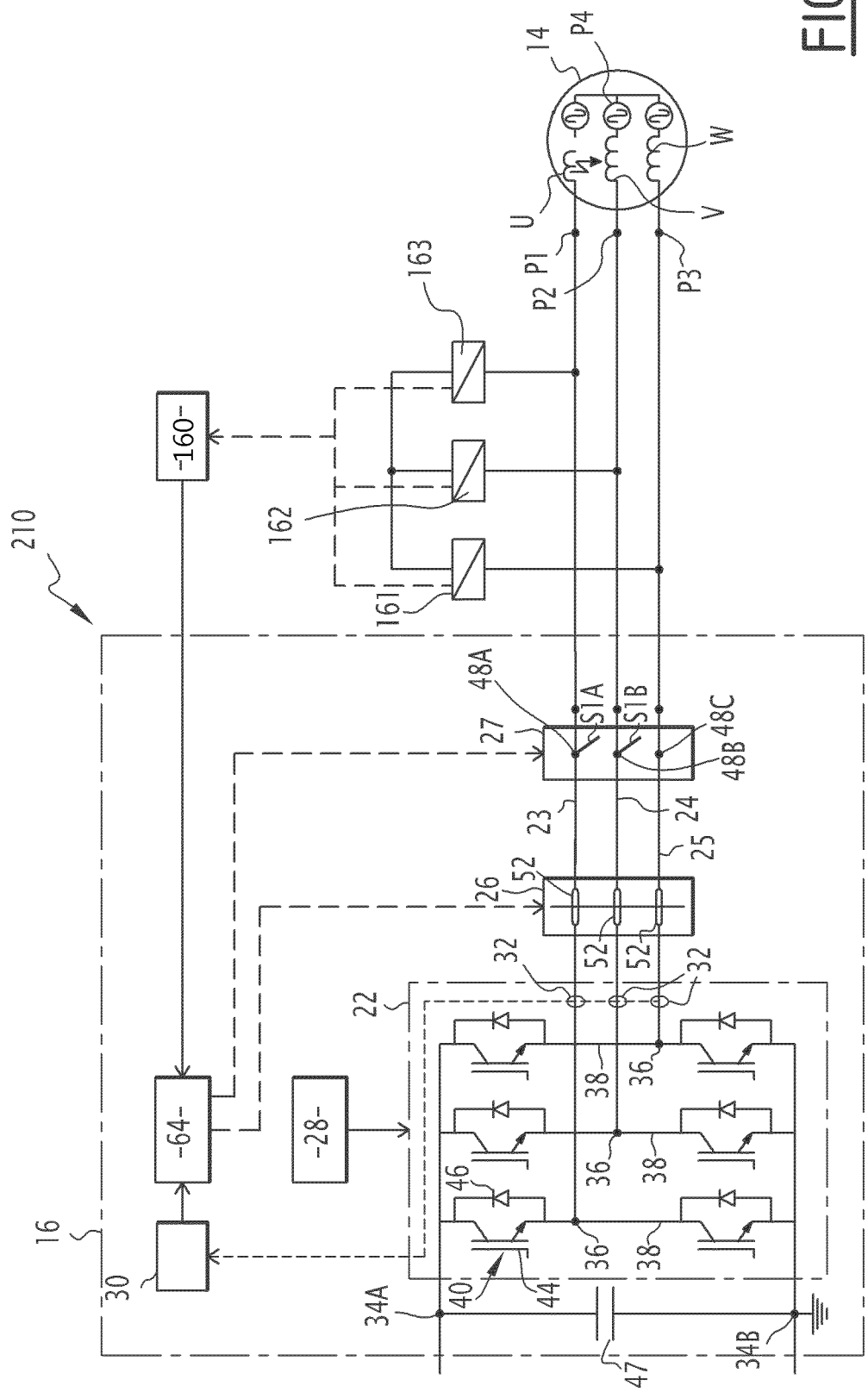
FIG. 3 is a diagrammatic illustration of an alternative of the system according to a second embodiment of the invention.
Figure 4:
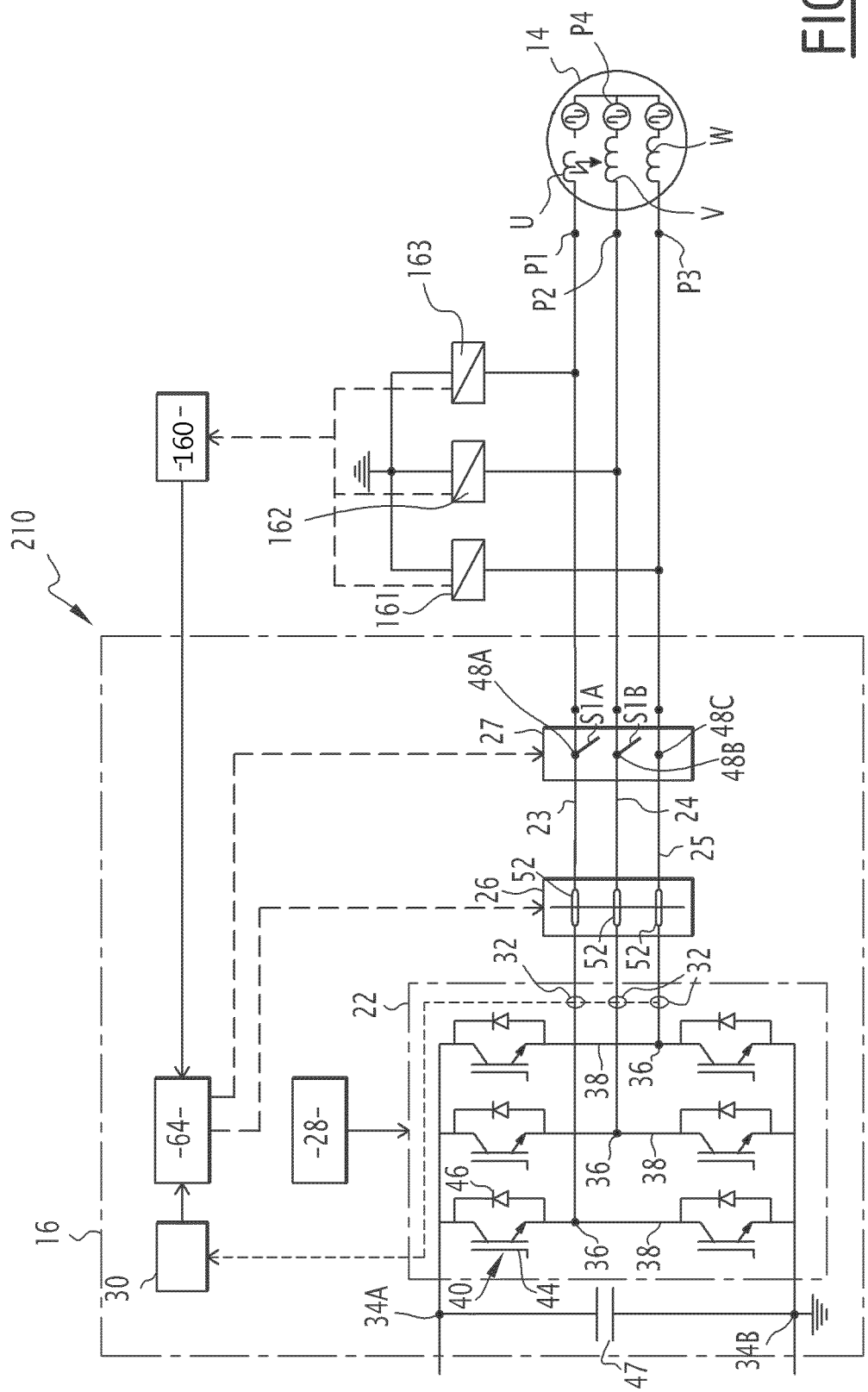
FIG. 4 is a diagrammatic illustration of still another alternative of the system according to a second embodiment of the invention.

FIGS. 3 and 4 show alternatives of the second embodiment.

In the system 210 of FIG. 3, the voltage sensors 161, 162 and 163 are connected on the one hand to an input terminal of the synchronous electric machine 14 and on the other hand to a shared connection point with the different voltage sensors.

In the system 210 of FIG. 4, this shared connection point between the voltage sensors 161, 162 and 163 is connected to a ground of the system.

The power supply circuit according to the invention makes it possible to reduce the amplitude of the pulsation torques and short-circuit currents created within the electric machine, upon the appearance of a short-circuit internal to the electric machine, and thus to avoid the appearance of an undesirable phenomenon.

What is claimed is:

1. An electric traction system for a railway vehicle, comprising:
   a synchronous electric traction machine having a plurality of phases; and,
   a power supply circuit, the power supply circuit including a converter, connected to a DC voltage source and delivering a polyphase voltage adapted to power the synchronous electric traction machine to which the converter is connected by a plurality of electric cables, an insulator and an electrical connector configured to be capable of short-circuiting the phases of the synchronous electric traction machines, placed downstream from the insulator,
   the synchronous electric traction machine further comprising a converter control, a primary detector for detecting an over-current in a plurality of output branches of the converter, and an actuator configured to actuate an opening of the insulator upon reception of a primary detection signal emitted by the primary detector,
   wherein the electric traction system further includes a secondary detector for detecting a fault of a short-circuit type downstream from the insulator and emitting a secondary detection signal toward the actuator,
   and wherein the actuator actuates a closing of the electrical connector for short-circuiting the phases of the synchronous electric traction machine upon reception of the secondary detection signal, on the condition the actuator has already received the primary detection signal emitted by the primary detector and having led to actuating the opening of the insulator wherein the secondary detector include at least one temperature sensor, for measuring a temperature corresponding to an internal temperature of the synchronous electric traction machine.

2. The system according to claim 1, wherein the secondary detector includes a secondary detection device for calculating a time variation of the temperature measured by the or each temperature sensor.

3. The system according to claim 2, wherein the secondary detection device compares the time variation of the temperature to a predetermined threshold, and emits a short-circuit detection signal when the time variation of the temperature is above said predetermined threshold.

4. The system according to claim 3, wherein the predetermined threshold is greater than +1.0° C./s.

5. The system according to claim 1, wherein the secondary detector discriminates whether the over-current detected by the primary detector is a non-dead short-circuit external to the synchronous electric traction machine of the initiating type between the electric cables, by comparing a time variation of the temperature to a second predetermined threshold.

6. A securing method implemented in an electric traction system for a railway vehicle, comprising:
   a synchronous electric traction machine having a plurality of phases; and,
   a power supply circuit, the power supply circuit including a converter, connected to a DC voltage source and delivering a polyphase voltage adapted to power the synchronous electric traction machine to which the converter is connected by a plurality of electric cables, an insulator and an electrical connector configured to be capable of short-circuiting the phases of the synchronous electric traction machines, placed downstream from the insulator, the synchronous electric traction machine further comprising a converter control, a primary detector for detecting an over-current in a plurality of output branches of the converter, and an actuator configured to actuate an opening of the insulator upon reception of a primary detection signal emitted by the primary detector, wherein the electric traction system further includes a secondary detector for detecting a fault of a short-circuit type downstream from the insulator and emitting a secondary detection signal toward the actuator, and wherein the actuator actuates a closing of the electrical connector for short-circuiting the phases of the synchronous electric traction machine upon reception of the secondary detection signal, on the condition the actuator has already received the primary detection signal emitted by the primary detector and having led to actuating the opening of the insulator wherein the secondary detector include at least one temperature sensor, for measuring a temperature corresponding to an internal temperature of the synchronous electric traction machine, wherein the securing method includes the steps successively consisting of:

detecting an overvoltage in at least one output branch of the converter;

actuating the opening of the insulator;

then detecting a fault of the short-circuit type downstream from the insulator; and, in the affirmative, actuating the closing of the electrical connector for short-circuiting the phases of the synchronous electric traction machine.

* * * * *